(12) United States Patent
Nagel

(10) Patent No.: US 7,607,383 B2
(45) Date of Patent: Oct. 27, 2009

(54) SYSTEM FOR BACKUP ROD SEAL FOR HYDRAULIC CYLINDER

(76) Inventor: Robert W. Nagel, 205 N. Miami St., Wabash, IN (US) 46992

( * ) Notice: Subject to any disclaimer, the term of this patent is extended or adjusted under 35 U.S.C. 154(b) by 289 days.

(21) Appl. No.: 11/799,395

(22) Filed: May 1, 2007

(65) Prior Publication Data
US 2008/0272554 A1 Nov. 6, 2008

(51) Int. Cl.
*F16J 10/00* (2006.01)
*F16J 15/00* (2006.01)

(52) U.S. Cl. ........................... 92/165 R; 92/168

(58) Field of Classification Search .............. 92/165 R, 92/168
See application file for complete search history.

(56) References Cited

U.S. PATENT DOCUMENTS

| | | | |
|---|---|---|---|
| 2,573,567 A | 10/1951 | Hancock | |
| 3,540,741 A * | 11/1970 | Lefebvre | 92/168 |
| 3,642,069 A | 2/1972 | Adkins | |
| 4,084,668 A | 4/1978 | Rybicki | |
| 4,088,061 A * | 5/1978 | Stoll et al. | 91/26 |
| 4,227,573 A | 10/1980 | Pearce et al. | |
| 4,476,772 A | 10/1984 | Gorman et al. | |
| 4,681,516 A | 7/1987 | O'Hara et al. | |
| 5,014,603 A | 5/1991 | Navarette et al. | |
| 5,107,970 A | 4/1992 | Driessen et al. | |
| 5,469,704 A * | 11/1995 | Kramer | 60/455 |
| 5,495,792 A * | 3/1996 | Izumi et al. | 92/165 R |
| 5,575,626 A | 11/1996 | Brown et al. | |
| 6,158,967 A | 12/2000 | Dupre | |
| 6,547,046 B2 | 4/2003 | Yamaguchi et al. | |
| 6,758,127 B2 * | 7/2004 | Schult | 92/165 PR |
| 7,011,193 B2 | 3/2006 | Lemmens et al. | |
| 2006/0272498 A1 * | 12/2006 | Fischer | 92/165 R |

FOREIGN PATENT DOCUMENTS

| | | |
|---|---|---|
| EP | 0067239 A1 | 12/1982 |
| EP | 0295395 A1 | 12/1988 |
| EP | 0997254 A2 | 5/2000 |
| JP | 2000046092 A | 2/2000 |

* cited by examiner

*Primary Examiner*—Thomas E Lazo
(74) *Attorney, Agent, or Firm*—Wegman, Hessler & Vanderburg

(57) ABSTRACT

A rod sealing system for use with a hydraulic cylinder is disclosed. The hydraulic cylinder has a cylinder tube and a cylinder head defining a working chamber. A piston is disposed for linear reciprocable movement within the working chamber and is connected to a piston rod projecting outwardly through the cylinder head. The rod sealing system includes a primary seal acting between the cylinder head and the piston rod and a secondary seal acting between the cylinder head and the piston rod. The rod sealing system also includes a back-up seal acting between the cylinder head and the piston rod and the cylinder head has a bypass channel fluidically connecting the working chamber with a chamber in the cylinder head between the back-up seal and the primary seal. Flow of hydraulic fluid through the bypass channel is selectively allowed or prevented with a bypass valve to selectively equalize the pressure across said back-up seal when the back-up seal is not in service.

12 Claims, 2 Drawing Sheets

SYSTEM FOR BACKUP ROD SEAL FOR HYDRAULIC CYLINDER

BACKGROUND OF THE INVENTION

1. Field of Invention

This invention relates to a rod sealing system for a hydraulic cylinder, and more specifically to a rod sealing system having a back-up rod seal and a method of providing back-up rod sealing protection.

2. Description of Related Art

Hydraulic cylinders have a variety of uses and are well known in the art. One conventional design of a hydraulic cylinder has a piston rod which extends to through the cylinder head and is sealed by means of a two seals. The primary seal which is located closer to the working or operating chamber of the piston is a ring which consists of a rubber or another material having a stable shape, for instance a synthetic material having the respective characteristics. The primary seal is wear resistant but not free of leakage. In some applications, an annular collecting groove may be provided between the primary seal and the secondary seal to collect the leakage oil which is not held back by the primary seal. The leakage oil can be drained from the annular collecting groove by means of a leakage oil conduit extending from the annular collecting groove. Alternately, the leakage oil leaks past the secondary seal and onto the machinery or the ground.

With prolonged use, the primary seal begins to wear and more and more fluid will leak by the primary seal. In time, the primary seal becomes so worn that too much fluid leaks around the seal and overwhelms the low pressure secondary seal. When this happens the fluid will leak around the rod and onto the cylinder and beyond. This leakage of hydraulic fluid can cause various environmental and safety concerns. Ultimately, the cylinder needs to be removed from service and the seal replaced. This leads to down time of the working machinery, and if it occurs at an inopportune time, the cost in down-time can be substantial.

It would be desirable to provide an improved hydraulic cylinder having a rod seal that has an extended life with a back-up seal without significant compromise of performance.

SUMMARY OF INVENTIVE FEATURES

One embodiment of the invention is directed to a rod sealing system for use with a hydraulic cylinder. The hydraulic cylinder has a cylinder tube and a cylinder head defining a working chamber. A piston is disposed for linear reciprocable movement within the working chamber and is connected to a piston rod projecting outwardly through the cylinder head. The rod sealing system includes a primary seal acting between the cylinder head and the piston rod and a secondary seal acting between the cylinder head and the piston rod. The rod sealing system also includes a back-up seal acting between the cylinder head and the piston rod. The cylinder head has a bypass channel fluidically connecting the working chamber with a chamber in the cylinder head between the back-up seal and the primary seal. Flow of hydraulic fluid through the bypass channel is selectively allowed or prevented with a bypass valve to selectively equalize the pressure across said back-up seal when the back-up seal is not in service.

Another aspect of the invention is directed to a method of providing back-up rod sealing protection in a hydraulic cylinder when its primary seal becomes worn. The hydraulic cylinder has a cylinder tube and a cylinder head defining a working chamber and a piston disposed for linear reciprocable movement within the working chamber and connected to a piston rod projecting outwardly through the cylinder head. The method includes providing a primary seal acting between the cylinder head and the piston rod and providing a secondary seal acting between the cylinder head and the piston rod. The method also includes providing a back-up seal acting between the cylinder head and the piston rod and providing a bypass channel fluidically connecting the working chamber with a chamber in the cylinder head between the back-up seal and the primary seal, wherein flow of hydraulic fluid through the bypass channel is allowed to equalize the pressure across said back-up seal when the back-up seal is not in service. The method includes placing the back-up seal in service by closing the bypass valve.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
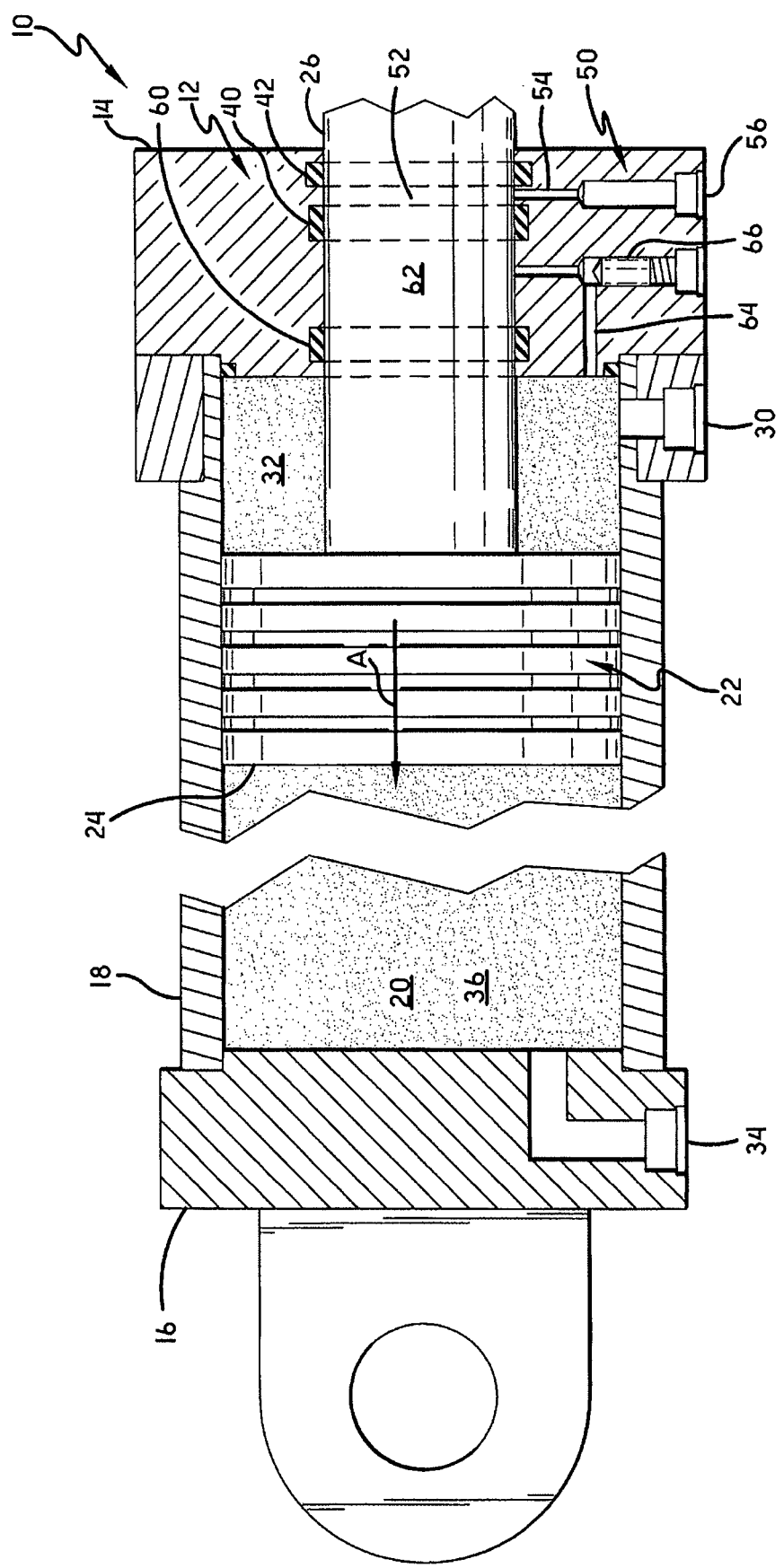
FIG. 1 is a sectional view of a cylinder with a rod leakage sealing system according to the invention.

Referring now to FIG. 1, a cylinder 10 is shown that incorporates a rod sealing system 12 according to an embodiment of the invention. The cylinder 10 has a cylinder head 14, a cylinder bottom 16 and a cylinder tube 18 extending between said cylinder head 14 and said cylinder bottom 16. The cylinder tube 18, the cylinder head 14 and the cylinder bottom 16 form an operating or working chamber 20. Disposed for linear reciprocable movement within the working chamber 20 is a piston assembly 22 having a piston 24 secured to one end of an axially extending piston rod 26. The piston rod 26 projects outwardly via a centrally located passage in the cylinder head 14. Also provided within the cylinder head 14 is a working port 30 which leads to a piston rod side pressure chamber 32 of the working chamber 20. A working port 34 in the cylinder bottom 16 leads to a piston side pressure chamber 36 of the working chamber 20. Directional movement of the piston 24 in the working chamber 20 is controlled by porting fluid through working ports 30 and 34 as is conventional in the art such as with a directional valve (not shown) and a switching solenoid (not shown). The portions of the cylinder 10 heretofore described are conventional in nature and need not be described in further detail.

Leakage of hydraulic fluid around the piston rod 26 is controlled by means of the rod sealing system 12 which includes a first or primary seal 40 and a secondary seal 42. The primary seal 40 is concentrically disposed intermediate the piston rod side pressure chamber 32 and the secondary seal 42 and is sized to form a close sliding fit with the piston rod 26. Desirably, the primary seal 40 is a tubular sleeve fabricated from any suitable material such as rubber. When the cylinder 10 is activated to draw the rod 26 inward, as shown by the arrow A in FIG. 1, the hydraulic fluid flows through the port 30 into the piston rod side pressure chamber 32 located between the piston 24 and the cylinder head 14 of the cylinder 10. The fluid is kept from escaping around the rod 26 by the primary seal 40 located in the cylinder head 14 which rubs against the rod 26.

However, the primary seal 40 is not free of leakage. The hydraulic fluid which does leak past the primary seal 40 is kept from escaping from the cylinder by the secondary seal 42 and in one embodiment is diverted to a leakage collection system 50. As the primary seal 40 causes a relatively large pressure drop from the piston rod side portion 32 of the working chambers 16, the secondary seal 42 may be a low pressure seal and can be a relatively rigid rubber seal ring disposed in annular groove for sealing engagement with the piston rod 26. Between the primary seal 40 and the secondary seal 42, which are spaced from each other, an annular leakage chamber 52 is machined into the cylinder head 14. The annular leakage chamber 52 is open toward the piston rod 26 and serves as a collecting chamber or space for the leakage oil passing through the primary seal 40. In the illustrated embodiment, a radial bore 54 extends from the annular leakage chamber 52 toward the outer surface of the cylinder head 14 having an outlet for permitting fluid communication between the leakage chamber and a leakage port 56. The leakage port 56 may be connected to a tank (not shown) for collecting leakage fluid. One skilled in the art will recognize, however, that the inclusion of the radial bore 54 and the leakage port 56 is not necessary to the invention.

As the primary seal 40 becomes worn with use, more and more hydraulic fluid will leak past the primary seal 40 and be collected in the annular chamber 52. Without corrective action, the primary seal 40 can become so worn that too much fluid leaks past the primary seal 40 and would therefore overwhelm the low pressure secondary seal 42.

According to the invention, the rod sealing system 50 also includes a back-up rod seal 60. Desirably, the back-up rod seal 60 is structurally substantially similar to the primary seal 40 such that the back-up seal can substantially control leakage of hydraulic fluid around the piston rod 26. The back-up seal 60 is positioned intermediate the primary seal 40 and the piston rod portion 32 of the working chamber 20. An annular chamber 62 is formed in the cylinder head 14 between the back-up seal 60 and the primary seal 40. A bypass channel 64 is formed in the cylinder head 14 fluidically connecting the piston rod portion 32 of the working chamber 20 to the annular chamber 62 such that hydraulic fluid may flow through the bypass channel and bypass the back-up seal 60. A bypass valve 66 is positioned in the bypass channel 64 to selectively allow or prevent the passage of hydraulic fluid through the bypass channel 64. Preferably, the bypass valve 66 is a cut off flow control valve which is selectively controllable for opening and closing fluid flow in the bypass channel 64.

Figure 2:
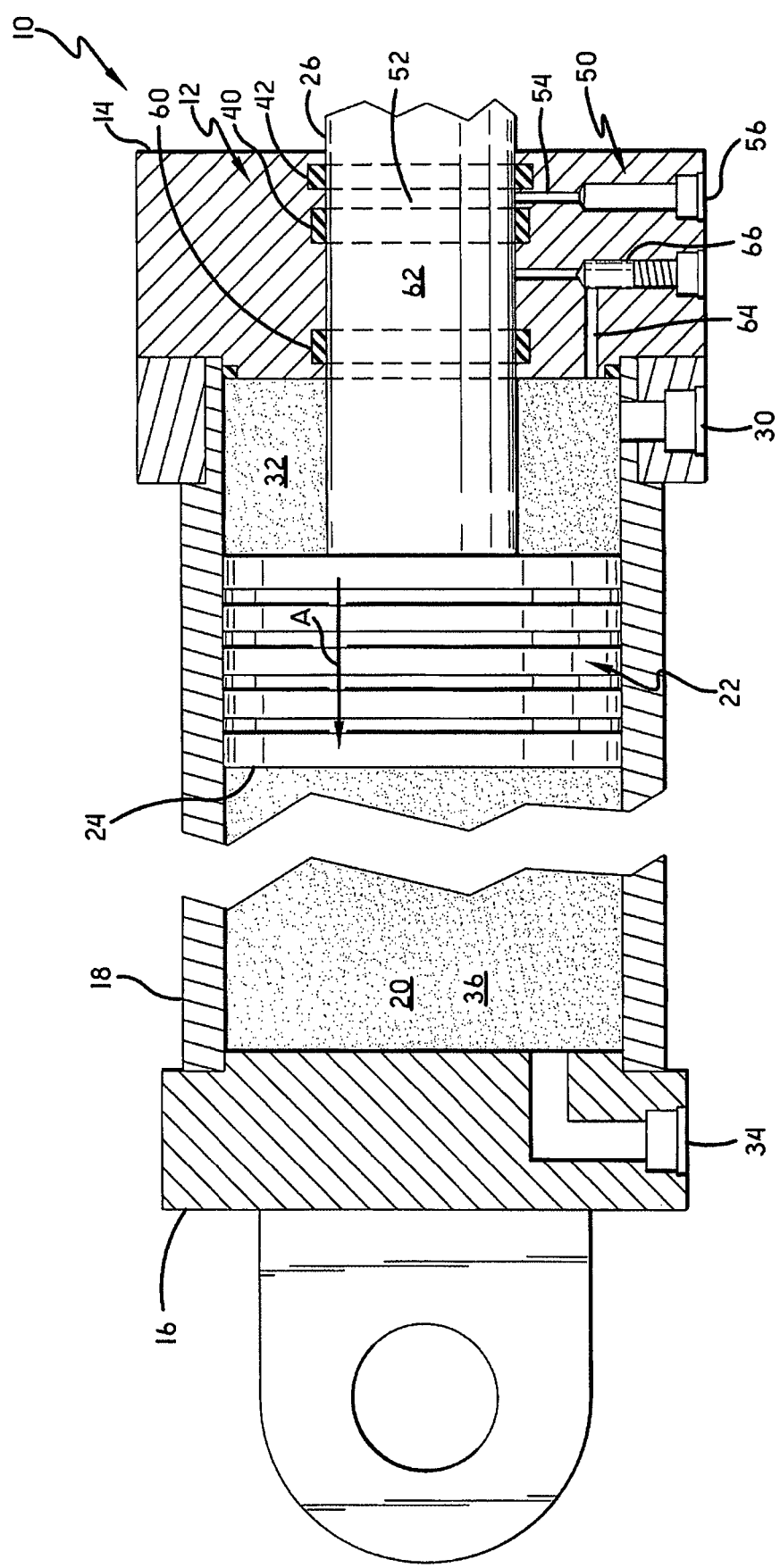
FIG. 2 is a sectional view of the cylinder of FIG. 1 with a back-up rod seal in service.

When the cylinder 10 is first put into operation, the bypass valve 66 is left open, allowing the hydraulic fluid to flow through the bypass channel 64 so that the annular chamber 62 is maintained at substantially the same pressure as the piston rod portion 32 of the working chamber as shown in FIG. 1. In this condition, the primary seal 40 acts as the sealing member and pressurized hydraulic fluid is present on both sides of the back-up seal 60. Having pressurized hydraulic fluid on both sides of the back-up seal 60 when the primary seal 40 is in service reduces the wear that otherwise would be caused by asymmetrical pressure across the seal. When the primary seal 40 becomes worn, the pressure can be diverted to the unused back-up seal 60 by closing the bypass valve 66 as shown in FIG. 2. Any leakage of hydraulic fluid past the back-up seal 60 leaks past the worn primary seal 40 and into the leakage collection system 50 as described above.

It therefore can be seen that the improved sealing system 12 has an extended life by providing an additional back-up seal 60 that can be placed in service after the primary seal 40 becomes worn. Additionally, maintenance to repair the cylinder 10 can be scheduled at an opportune time once the back-up seal 60 is placed in service rather than being forced to repair the cylinder 10 either when the primary seal fails or at shortened intervals before the anticipated failure of the primary seal.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A hydraulic cylinder having a cylinder tube and a cylinder head defining a working chamber, a piston being disposed for linear reciprocable movement within the working chamber and connected to a piston rod projecting outwardly through the cylinder head, and a rod sealing system capable of being adjusted so as to place back-up rod sealing protection in service when its primary seal becomes worn, wherein the rod sealing system comprises:

a primary seal acting between the cylinder head and the piston rod;

a secondary seal acting between the cylinder head and the piston rod;

a back-up seal acting between the cylinder head and the piston rod; and a bypass valve located in a bypass channel in the cylinder head, said bypass channel fluidically connecting the working chamber with a chamber in the cylinder head between the back-up seal and the primary seal, wherein flow of hydraulic fluid through the bypass channel is selectively allowed or prevented with the bypass valve;

wherein the bypass valve is configured such that it places the primary seal in service when the cylinder is first put into operation when said bypass valve is placed in its open position, thereby allowing the flow of hydraulic fluid through the bypass channel, so that the chamber in the cylinder head is maintained at substantially the same pressure as a piston rod portion of the working chamber such that the primary seal acts as the sealing member to control leakage of hydraulic fluid around the piston rod, and pressurized hydraulic fluid at substantially identical pressure is present on both sides of the back-up seal such that the back-up seal is not in service to control leakage of hydraulic fluid around the piston rod, and the bypass valve is further configured such that it places the back-up seal in service when said bypass valve is placed in its closed position, such that the back-up seal controls leakage of hydraulic fluid around the piston rod.

2. A hydraulic cylinder according to claim 1 wherein the back-up rod seal is structurally substantially similar to the primary seal.

3. A hydraulic cylinder according to claim 1 wherein the back-up seal is positioned intermediate the primary seal and the working chamber.

4. A hydraulic cylinder according to claim 1 wherein a chamber is formed in the cylinder head between the back-up seal and the primary seal and the bypass channel is formed in the cylinder head so as to fluidically connect a piston rod portion of the working chamber to the chamber in the cylinder head such that hydraulic fluid may flow through the bypass channel and bypass the back-up seal.

5. A hydraulic cylinder according to claim 1 wherein the bypass valve is a cut off flow control valve which is selectively controllable for opening and closing fluid flow in the bypass channel.

6. A method of providing back-up rod sealing protection in a hydraulic cylinder when its primary seal becomes worn, the hydraulic cylinder having a cylinder tube and a cylinder head defining a working chamber and a piston disposed for linear reciprocable movement within the working chamber and connected to a piston rod projecting outwardly through the cylinder head, wherein the method comprises:
  providing a primary seal acting between the cylinder head and the piston rod;
  providing a back-up seal acting between the cylinder head and the piston rod;
  providing a bypass channel with a bypass valve therein fluidically connecting the working chamber with a chamber in the cylinder head between the back-up seal and the primary seal,
  placing the primary seal in service when the cylinder is first put into operation by opening the bypass valve thereby allowing the hydraulic fluid to flow through the bypass channel so that the chamber in the cylinder head is maintained at substantially the same pressure as a piston rod portion of the working chamber such that the primary seal acts as the sealing member to control leakage of hydraulic fluid around the piston rod, and pressurized hydraulic fluid at substantially identical pressure is present on both sides of the back-up seal; and
  placing the back-up seal in service when the primary seal becomes worn by closing the bypass valve such that the back-up seal controls leakage of hydraulic fluid around the piston rod.

7. A hydraulic cylinder having a cylinder tube and a cylinder head defining a working chamber, a piston being disposed for linear reciprocable movement within the working chamber and connected to a piston rod projecting outwardly through the cylinder head, and a rod sealing system capable of being adjusted so as to place back-up rod sealing protection in service when its primary seal becomes worn, wherein the rod sealing system comprises:
  a primary seal acting between the cylinder head and the piston rod;
  a back-up seal acting between the cylinder head and the piston rod; and
  means for placing the primary seal in service when the cylinder is first put into operation such that the primary seal acts as the sealing member to control leakage of hydraulic fluid around the piston rod and pressurized hydraulic fluid at substantially identical pressure is present on both sides of the back-up seal such that the back-up seal is not in service to control leakage of hydraulic fluid around the piston rod, said means also configured to selectively place the back-up seal in service when the primary seal becomes worn such that the back-up seal controls leakage of hydraulic fluid around the piston rod.

8. A hydraulic cylinder according to claim 7 wherein the back-up seal is positioned intermediate the primary seal and the working chamber.

9. A hydraulic cylinder according to claim 7 wherein said means for selectively placing the primary or the back-up seal in service comprises a bypass channel that bypasses said back-up seal and a bypass valve located in said bypass channel.

10. A hydraulic cylinder according to claim 9 wherein a chamber is formed in the cylinder head between the back-up seal and the primary seal and the bypass channel is formed in the cylinder head so as to fluidically connect a piston rod portion of the working chamber to the chamber in the cylinder head such that hydraulic fluid may flow through the bypass channel and bypass the back-up seal.

11. A hydraulic cylinder according to claim 9 wherein the bypass valve is configured such that it places the primary seal in service when the cylinder is first put into operation when said bypass valve is placed in its open position, thereby allowing the flow of hydraulic fluid through the bypass channel, so that the chamber in the cylinder head is maintained at substantially the same pressure as a piston rod portion of the working chamber such that the primary seal acts as the sealing member to control leakage of hydraulic fluid around the piston rod, and pressurized hydraulic fluid at substantially identical pressure is present on both sides of the back-up seal such that the back-up seal is not in service to control leakage of hydraulic fluid around the piston rod, and the bypass valve is further configured such that it places the back-up seal in service when said bypass valve is placed in its closed position, such that the back-up seal controls leakage of hydraulic fluid around the piston rod.

12. A hydraulic cylinder according to claim 11 wherein the bypass valve is a cut off flow control valve which is selectively controllable for opening and closing fluid flow in the bypass channel.

* * * * *